United States Patent [19]

Chalmers

[11] Patent Number: 4,557,622
[45] Date of Patent: Dec. 10, 1985

[54] ADJUSTABLE TORQUE ROD

[76] Inventor: Wallace G. Chalmers, 10 Avoca Ave., Ste. 1504, Toronto, Ontario, Canada, M4T 2B7

[21] Appl. No.: 586,898

[22] Filed: Mar. 7, 1984

[30] Foreign Application Priority Data

Mar. 12, 1983 [GB] United Kingdom ............... 8306847

[51] Int. Cl.$^4$ ............................................. F16B 7/18
[52] U.S. Cl. .................................... 403/388; 403/393
[58] Field of Search .............................. 403/388, 393

[56] References Cited

U.S. PATENT DOCUMENTS

| | | | |
|---|---|---|---|
| 1,985,582 | 12/1934 | Schwinger | 403/393 X |
| 2,584,709 | 2/1952 | Johnson | 403/393 X |
| 3,318,099 | 5/1967 | Sugden | 403/388 X |
| 3,745,853 | 7/1973 | Deibel | 403/393 X |
| 3,830,581 | 8/1974 | Furlong | 403/388 X |

Primary Examiner—Andrew V. Kundrat
Attorney, Agent, or Firm—Arne I. Fors; Robert F. Delbridge

[57] ABSTRACT

An adjustable torque rod having a pair of identical, transversely-serrated mating castings disposed intermediate the torque rod ends secured together by a bolt passing through mating slots formed in the castings for longitudinal axial adjustment.

The transverse serrations preferably are formed on generally planar surfaces, said surfaces inclined at an angle up to about 40°, preferably about 20°, to the longitudinal axis of the torque rod.

4 Claims, 4 Drawing Figures

ADJUSTABLE TORQUE ROD

This invention relates to torque rods and, more particularly, torque rods which are adjustable in length.

Vehicle suspensions using torque rods, particularly tandem axle suspensions, require alignment adjustment. This is normally done by providing a torque rod having the opposite ends threaded with right- and left-hand threads onto a tube such that rotation of the tube shortens or lengthens the rod as desired. This requires end castings which receive extensive machining and internal threading in addition to reverse threading of opposite ends of the tube. Vernier adjustment of the torque rod is thus provided, but this degree of accuracy normally is not necessary.

The present invention is directed to a novel steel torque rod which eliminates machining of the torque rod ends by the use of simple and identical rod-end fittings welded into a tube having axial adjustment means secured thereto. The adjustment mean comprises two identical transversly-serrated castings disposed intermediate the torque rod ends to permit joining together for longitudinal axial adjustment by a bolt passing through mating slots formed in the castings. The degree of longitudinal adjustment provided by means of the transverse serrations is within one-half of a serration pitch which is normally adequate for conventional torque rod use.

The torque rod assembly of the invention, in its broad aspect, comprises, in combination, an elongated rod having a longitudinal axis; securing means formed at each end of the rod; and adjustment means intermediate the securing means, said adjustment means comprising a pair of identical mating components each having an end portion affixed to a securing means or to the rod, a body portion having a plurality of serrations transverse to the longitudinal axis of the rod formed thereon whereby the body portion of one adjustment component intermeshes with the body portion of the other adjustment component for longitudinal adjustment, and means for fastening the mating adjustment components together.

Each adjustment component body portion has said transverse serrations formed on a generally planar surface, said surface inclined at an angle within the range of 0° to 40°, preferably about 20°, to the longitudinal axis of the rod.

The fastening means normally comprise a longitudinal mating slot formed centrally in each adjustment component body portion and a nut and bolt assembly adapted to extend through said mating slots for securing said adjustment components together.

The present invention will now be described with reference to the accompanying drawing, in which.

Figure 1:
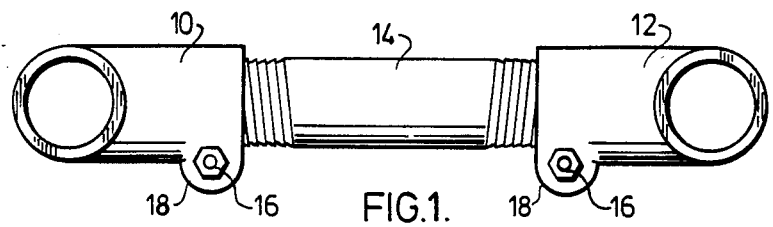
FIG. 1 is a side view of a conventional torque rod having opposite rod ends threaded onto a tube.

The conventional torque rod shown in FIG. 1 comprises two rod ends 10, 12 threaded onto a tube 14 and secured thereto by means of pinch bolts 16 passing through lugs 18, well known in the art. Rod ends 10, 12 have opposite left- and right-hand threads formed therein to receive the ends of rod 14. A high degree of accuracy of axial adjustment can be obtained by rotating tube 14 relative to rod ends 10, 12 or by rotating one rod end relative to the other rod end, for shortening or lengthening the effective length of the torque rod.

Figure 2:
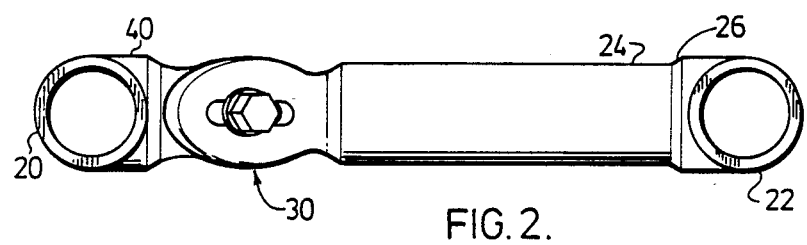
FIG. 2 is a side elevation of a torque rod of the present invention.
Figure 3:
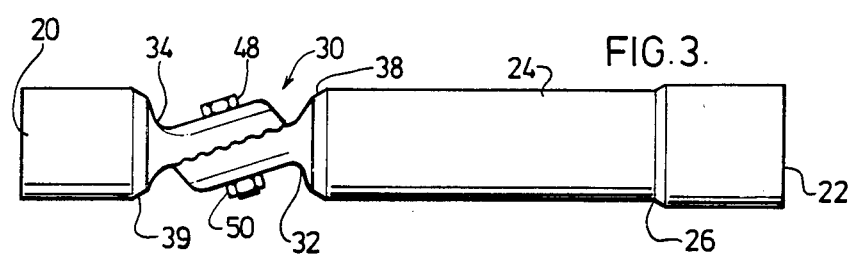
FIG. 3 is a top view of the torque rod shown in FIG. 2.

FIGS. 2 and 3 illustrate the torque rod of the present invention which comprises steel rod ends 20, 22 having a length of steel tube 24 secured to a rod end 22 such as by a weld 26.

Figure 4:
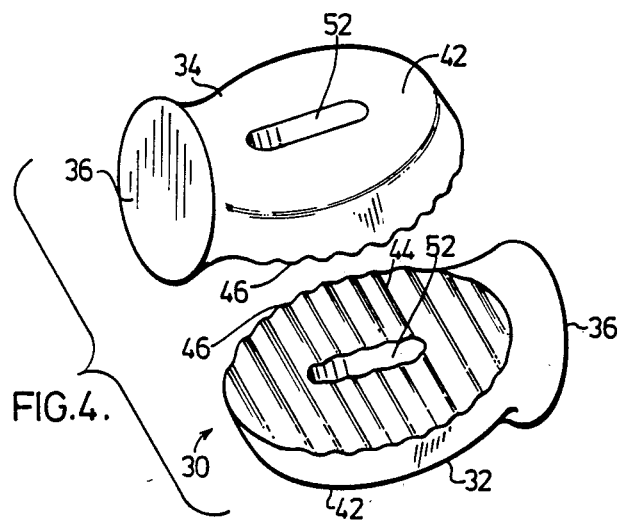
FIG. 4 is a perspective view of the adjustment components separated from each other.

Adjustable connector depicted by numeral 30 and shown in more detail in FIG. 4 comprises a pair of identical, mating components 32, 34 cast from high tensile steel. Each component 32, 34 consists of an end portion 36 having a transverse shape adapted for securement such as by weld 38 to an end of tube 24 or by weld 39 to extension 40 of rod end 20. Body portion 42 of each mating adjustment component has a generally planar surface 44 with transverse serrations 46 formed thereon adapted to intermesh with each other as illustrated in FIGS. 2 and 3 for positive securement together by bolt 48 having nut 50 threaded thereon. Bolt 48 passes through slot 52 formed longitudinally in each portion 42.

The plane of surface 44 of each of body portions 42 can be inclined to the longitudinal axis of the torque rod at an angle up to about 40°, preferably at an angle of about 20°, as shown, or disposed substantially parallel to the longitudinal axis of the torque rod. Bolt 48 functions essentially to hold the adjustment components together with the mating serrations carrying any load imposed on the torque rod during use.

The use of high tensile steel having 85,000 psi yield strength and 105,000 psi ultimate strength for the torque rod components, with welding together of the units comprising each connector component, results in an easily fabricated, strong torque rod.

The minimum adjustment of the adjustment components is equivalent to one serration pitch permitting adjustment to within one-half of a serration pitch of the desired length. Adjustment components produced by sand casting can provide a pitch of 0.1 in. The adjustment components can be provided at one or both ends of a torque rod or located central of the length of the torque rod.

It will be understood that modifications can be made in the embodiment of the invention illustrated and described herein without departing from the scope and purview of the invention as defined by the appended claims.

What I claim as new and desire to protect by Letters Patent of the United States is:

1. An adjustable torque rod comprising, in combination, an elongated rod having a longitudinal axis; securing means formed at each end of the rod; and adjustment means formed intermediate the securing means, said adjustment means comprising a pair of identical mating components each having an end portion affixed centrally to a securing means or to the rod, a body portion having a plurality of serrations transverse to the longitudinal axis of the rod formed integral with each end portion whereby the body portion of one mating component intermeshes with the body portion of the other mating component for longitudinal adjustment, each body portion having said transverse serrations formed on a generally planar surface, said surface inclined at an angle up to about 40° to the longitudinal axis of the rod, fastening means comprising a longitudinal mating slot formed centrally in each component body portion, and a bolt adapted to extend through said mating slots substantially perpendicular to the generally planar surfaces for securing said mating components together.

2. An adjustable torque rod as claimed in claim 1 in which said securing means formed at each end of the rod comprise rod-end fittings.

3. An adjustable torque rod as claimed in claim 2 in which said adjustment components are formed of high tensile steel and are welded to the securing means or the rod.

4. An adjustable torque rod as claimed in claim 3 in which said generally planar surfaces are inclined at an angle of about 20° to the longitudinal axis of the rod.

* * * * *